United States Patent Office 2,946,357
Patented July 26, 1960

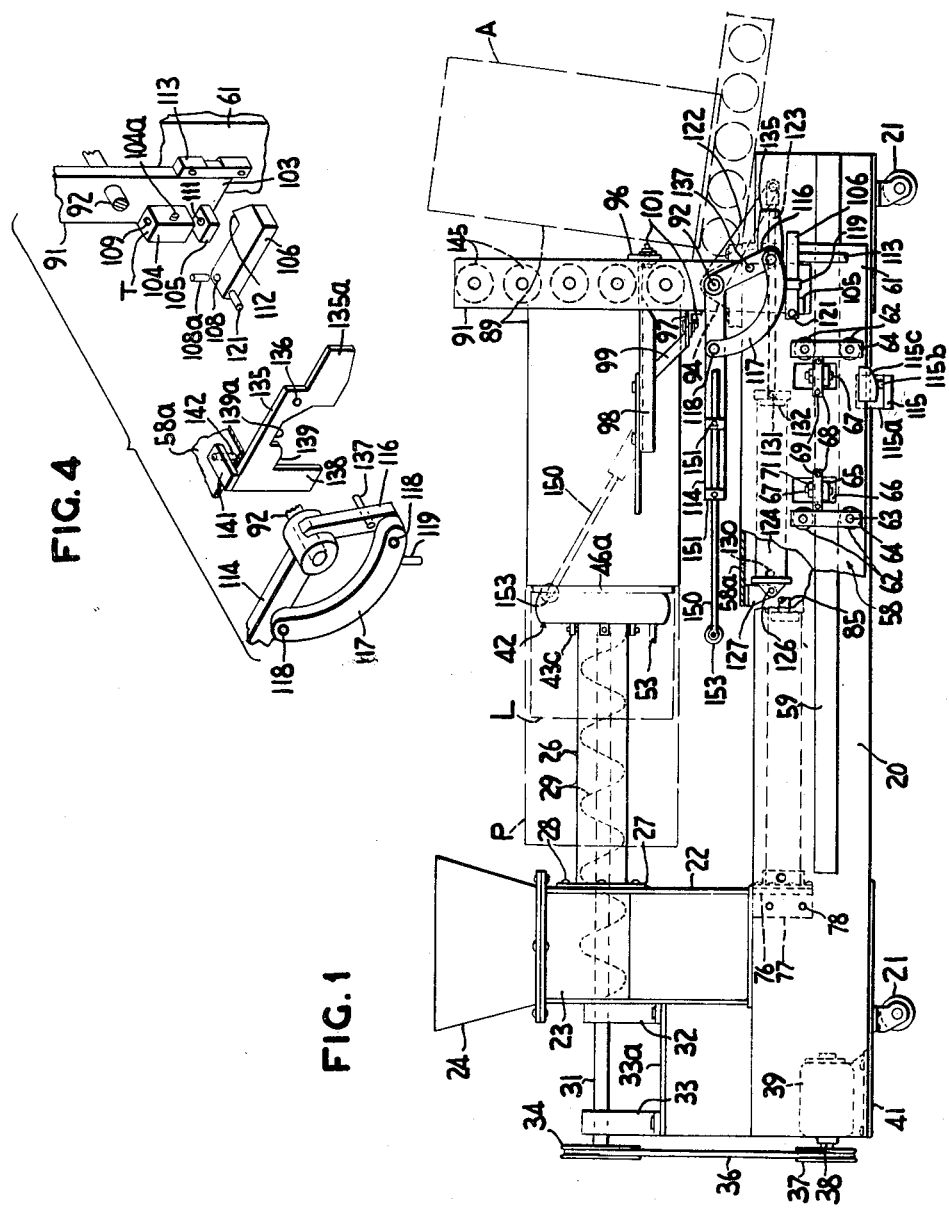

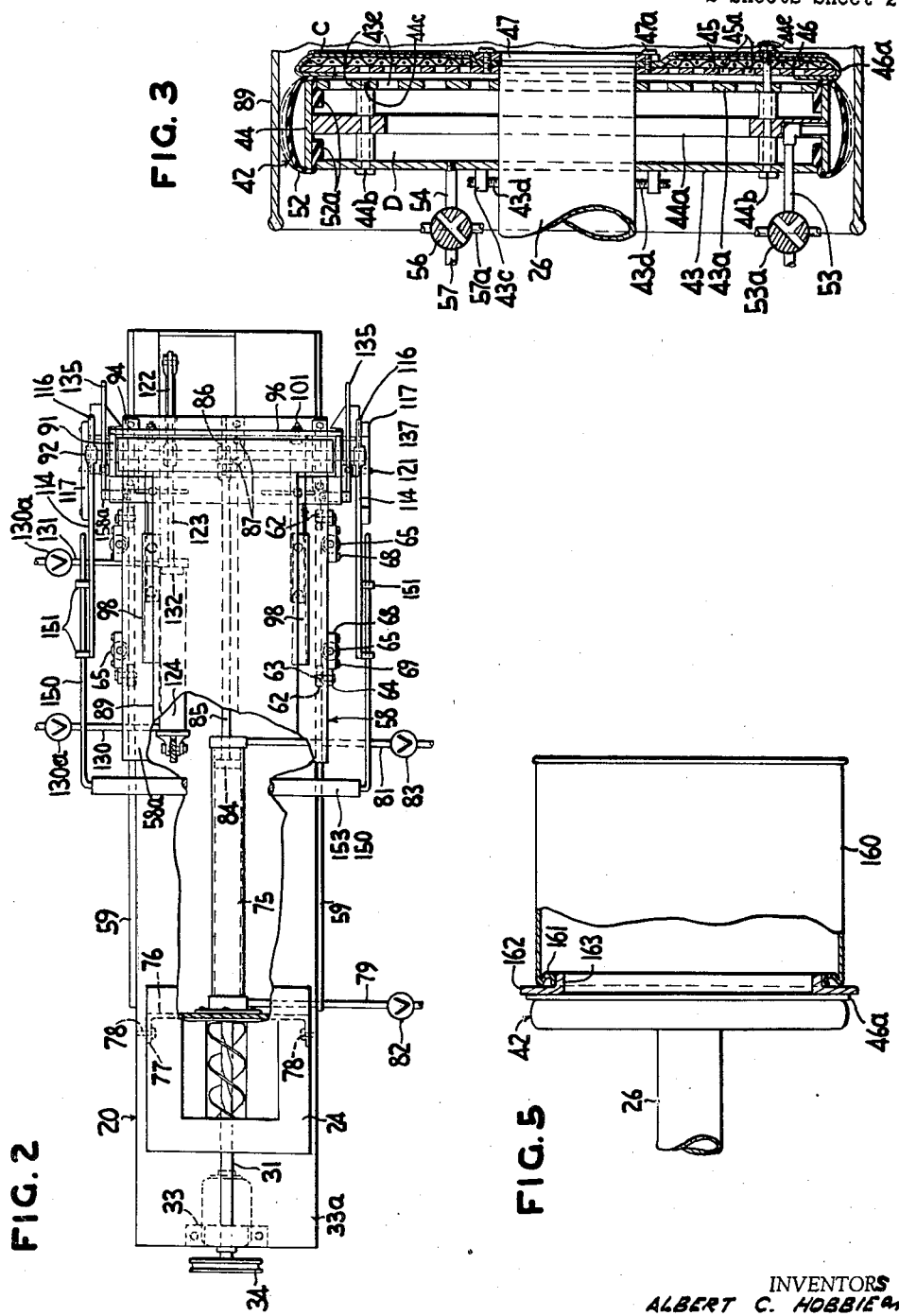

2,946,357

APPARATUS AND METHOD FOR PACKING PULVERULENT MATERIAL

Albert C. Hobbie, Moorestown, and Joseph W. Holdcraft, Oaklyn, N.J., assignors to Pittsburgh Plate Glass Company, Allegheny County, Pa., a corporation of Pennsylvania Filed Mar. 3, 1958, Ser. No. 718,697

15 Claims. (Cl. 141—5)

This invention relates to apparatus for filling pulverulent, more or less areated, material into containers and it has particular relation to apparatus for filling such material into containers by use of which the material is tightly packed with but little escape of particles into the atmosphere.

It has heretofore been suggested to pack pulverulent materials, such as flour, cement, lime, talc, insecticides, fungicides and many other pulverulent materials into containers, such as shipping containers, by allowing the materials to flow from a supply hopper into the containers through a spout provided with an appropriate gate device permitting the rate of flow to be regulated or to be stopped or started as required.

It has also been suggested to feed pulverulent material from a hopper or like receptacle through a tube into a container by means of a screw conveyor operating at low speed; e.g., 100 or 300 revolutions per minute.

Containers can readily be filled by use of such apparatus. However, serious problems are encountered in the use of the apparatus. For example, air, loaded with the pulverulent material, tends to escape about the spout or the screw conveyor as the case may be and thus produces loss of valuable material as well as problems of atmospheric contamination.

It has also been proposed to provide seals between the walls of the containers and the spouts or conveyors employed for filling the same, for purposes of reducing the escape of pulverulent material. One such sealing device comprises a doughnut-like, flexible pneumatic tube resembling an inner tube of an automobile tire which is disposed about the spout or conveyor. This tube is adapted to be expanded to provide a seal between the spout or conveyor and the container walls. Escape of dust is thus reduced, but it will be apparent that in the filling operation, air must somehow force its way from the container and may thus carry away suspended particles of the powdered material and discharge it to the atmosphere. Another serious defect of the previously-used apparatus resides in the fact that but little packing of the material in the container is produced. If a spout is used to fill the container, the material only drops into the container by gravity and still includes much entrapped air. The air seriously reduces the volume of material that can be introduced into the container thereby increasing container costs as well as the costs of shipping, handling and storing.

The use of a screw conveyor in the filling operation does not greatly enhance the packing of the material into the container. A conveyor as ordinarily used is driven at slow speed (previously mentioned) of the order of 100 or 300 revolutions per minute, and as mentioned, the screw is of about the same diameter as the internal diameter of the tube in which it runs. Appreciable backpressure on a screw operating under these conditions results in blocking and stoppage of the feed. A pressure of 1 or 2 pounds (p.s.i.) upon the material being packed is near the maximum that such screw conveyor will exert. Moreover, this pressure is exerted almost entirely directly in front or coaxially with respect to the screw, with practically no radial or side pressure upon the material after it escapes from the conveyor into the container. But very little removal of entrapped gases and packing action can be obtained by this mode of filling.

In order to reduce the volume of entrapped air in pulverulent material, which has been filled into containers by conventional spouts or screw conveyors, it has been disclosed to subject the containers, after the filling operation, to vacuum, thus drawing off much air and reducing the volume of powder. This, however, is a time-consuming operation and requires special apparatus. The degree of packing which can thus be obtained is often unsatisfactory.

In Patent 1,553,539, A. G. Kinyon, it is disclosed to impart a sluggish flow like that of a viscous liquid to a pulverulent material by incorporating small amounts of air therewith. This process of causing pulverulent material to flow as a liquid does not appear to lend itself to packing such materials as above described because of the air introduced in order to obtain flow. Since the object of packing is to reduce the flow of air, the use of a Kinyon-type apparatus to obtain fluidity of the material so that it will flow laterally as well as forwardly would appear to be a step in the wrong direction.

In accordance with the provisions of this invention, an apparatus and a mode of operating the same are provided whereby the foregoing difficulties are obviated and pulverulent material, such as those above described, or other pulverulent materials can be packed tightly into a container while the container is being filled. The use of the process and method of this invention obviates the necessity of vacuum packing or other types of packing after the filling operation.

Main features of the invention comprise feeding the pulverulent material into the container under such conditions that it develops substantial pressure both laterally and axially and then removing any entrapped air from the material while it is under such pressure. The pressures, as developed, are resembled closely by hydrostatic pressures exerted upon a viscous fluid which, as is well known, are transmitted in all directions.

It has been found that this result is quite effectively attained by use of a screw-type conveyor operating at high speeds. At such speeds the pulverulent material moves both axially and radially from the discharge end or mouth of the conveyor thus producing pressures not only in an axial direction but also laterally, thus effectively packing the material across the entire diameter of the container. This action is obtained even without the use of air to promote fluid flow of the powder.

For purposes of creating a backing against which the fluid pressure can act to compact the pulverulent material and to remove air already in the container before filling is started, it is preferable that the forward or discharge end of the screw conveyor be inserted into the container to a point at which it is at, or near the bottom of the latter. The packing action is thus initiated even at the start of the filling operation. It is also desirable that the discharge end of the conveyor be provided with a combined sealing and filtering element which will hold the powder tightly in place as it is filled into the container, but which will permit air to escape after filtration of the pulverulent material therefrom. It is a further feature that as the container is filled, it is progressively backed away from the discharge end of the screw thus permitting the container to be filled from bottom to top with the compact material.

In the drawings,

Fig. 1 is a view partly in elevation with certain parts broken away for clarity, of an apparatus embodying the invention.

Fig. 2 is a view in plan but with certain parts also broken away, of the apparatus shown in Fig. 1.

Fig. 3 is a fragmentary, sectional view of a portion of the apparatus shown in Fig. 1.

Fig. 4 is an exploded, detail view of certain mechanisms of the apparatus as shown in Figs. 1 and 2.

Fig. 5 is a sectional view of a modified form of sealing device for containers.

In the embodiment of the invention as disclosed in Fig. 1 of the drawings, a main, longitudinal frame or bed 20 is provided and if the apparatus is designed for portability, is disposed upon a set of wheels or castors 21. The latter permit the mechanism to be wheeled from job to job or to be wheeled to or from storage as may be required.

A base or pedestal 22 is mounted upon the rear end of the longitudinal frame as a support for a pump hopper 23 upon which is disposed a supply hopper 24 designed to contain a supply of pulverulent material to be packed.

Apparatus to convey material under fluid pressure to a container to be packed, comprises a pump tube 26 which is flanged at its rear end as indicated at 27 and is secured upon the face of the pump hopper 23 by means of bolts 28. A screw conveyor 29, acting as a pump, is disposed to rotate in the pump tube 26 and terminates at its forward end at or near the terminus of the pump tube. The forward end of the conveyor has no bearing other than the pump tube in which it rotates at relatively high speed.

The screw conveyor is carried upon a drive shaft 31 which at its exposed end, is disposed in bearings 32 and 33 upon a pedestal 33a upon main frame 20. It is also provided with a driving element, such as, a V-pulley 34 having a V-belt 36 trained thereabout. The belt is further trained about a second V-pulley 37 upon the shaft 38 of a driving motor 39 upon a platform 41 rigidly connected to the main frame 20.

The tube 26 and screw 29 are much smaller in diameter than the container to be filled. It is difficult satisfactorily to express the differences in numerical terms; however, as an approximate rule, it is suggested that the ratios of the internal diameters of the containers to the internal diameters of screw conveyor tube should be approximately in a range of about ½ up to ⅟₂₀. This range permits the provision of adequate sectional area between the walls of the tube 26 and the walls of the container for removal and filtration of air entrapped in the container or the pulverulent material contained therein.

A filtering and sealing element or head designated generally at 42 comprises spaced, parallel annular discs 43 and 43a, disposed upon the end of tube 26. These discs are retained within the inner perimeter of a cylindrical ring 44, which has an annular median web 44a bored to receive through bolts 44b whereby to hold the discs 43 and 43a in said spaced relationship to form a backing chamber D. Lugs 43c are also provided upon the sides of disc 43 and are tapped for set screws 43d adapted to retain the assembly upon the end of the tube 26. The filtering and sealing head is disposed in substantially normal relationship to the axis of the tube 42. Disc 43a is further provided with openings 43e adapted to permit the escape of filtered air from the container being filled.

Filtering means for the assembly comprises a disc 45 spaced slightly from the disc 43a and being formed with perforations 45a through which filtered air can enter chamber D. The face of this disc is covered with a screen wire element 46 having an outer filter cloth 46a to form a filter through which air in the container or its contents can pass, but constituting means for filtering out suspended particles and also providing a backing against which the fluid pressure exerted by the feed screw can act. The ends 44c of some of the bolts are threaded into the plate 45 to hold the latter in place while the ends of the rest of said bolts 44b extend through screen 46, the cloth 46a and at their tips are provided with washers and thin nuts 44c superposed upon the washers (not shown) to hold the screen in place. Removal and replacement of a screen and cloth assembly is thus facilitated, if the cloth is torn in use. The screen 46 is further held in place by an annular securing disc 47 bolted as indicated at 47a to disc 45.

Upon the perimeter of cylindrical ring 44 is disposed an approximately toroidal expansible sealing tube or diaphragm 52 of rubber or other flexible, impermeable material. This tube should be securely attached, as by cementing or vulcanizing to prevent possibility of loosening of the tube by frictional drag set up by the walls of the container as the latter moves backward during the filling and packing operation. As shown in the drawings, Fig. 3, the sealing tube comprises a wide endless band of rubber about the cylindrical ring 44 and forming when inflated substantially a toroidal tube. The edges of the filter cloth 46a is doubled over the edges of plate 45 and are gripped between the latter and the ends of the tube 52. As indicated at 52a, if desired, the edges of the band 52 may be formed with beads of rubber or other material providing reinforcements which are cemented to the underside of ring 44, thus holding the tube securely on the flange. The beads may also include grommets of wire or other material to act as reinforcements.

The tube 52 is also provided with a hose-connection 53 having a 3-way valve 53a for the admission of air under pressure to the sealing tube whereby the tube can be inflated or deflated at will.

When a container is mounted upon the sealing tube, fluid under pressure can be admitted to said tube to inflat it whereby to prevent the escape of air from within the container except through the annular filter. Any pulverulent material suspended in the escaping air is thus filtered out and is saved.

It will be apparent that in operation, the diaphragm 52 may even be inflated to such degree that the frictional drag exerted upon the inner walls of the container is sufficient to provide enough resistance to backward movement of the container to obtain adequate packing action within the container without reliance upon other braking devices.

The pulverulent material accumulates upon filter cloth 46a as a filter cake C of closely compacted powder which increases the filtering action; but obviously, the cake may become so thick and dense as to reduce the flow of air and thus it tends to interfere with the speed of packing of the pulverulent material in the container. It will be apparent that this filter cake usually tends to break away naturally from the annular filter disc in the operation of the apparatus, but if desired, it can be removed mechanically as, for example, by scraping or vibrating the annular filter.

The cake may also be removed by air pressure introduced into the filter backing chamber D. To this end an air conduit 54 to the chamber D is provided with a 3-way valve 56 and a pressure line 57 leading to a source (not shown) of fluid such as air under pressure. The valve also connects to vent line 57a. By appropriate manipulation of the 3-way valve, compressed air is admitted to the filter backing chamber D or it can be permitted to escape to the atmosphere. During normal packing operations, the valve is set to vent the filtered air from the container. When the cake C has become of such thickness as to warrant it, it may be loosened pneumatically by operating the 3-way valve to admit air under pressure to the filter backing chamber.

The foregoing arrangement affords a considerable degree of flexibility of operation in the packing operation.

For example, the apparatus may be used to pack containers substantially, solely by direct viscous fluid pressure afforded by the screw conveyor 29. The filter cake C that builds up may be allowed to break away naturally, as it will from time to time, or it may be removed mechanically or by pneumatic pressure from the pressure line 57 at such times as it appears to be becoming too thick.

It will be appreciated that the 3-way valve 56 may be operated at the end of each filling operation to admit pneumatic pressure to chamber D, forcing the dense filter cake loose at the top of the container thus to provide a relatively dense heading or covering upon the contents.

A further method of operation involves building up a filter cake and then forcing the cake C from the annular filter disc at regular intervals to provide in effect, a series of strata in contact with each other. In this method of operation, the bottom of the container is stepped away from the annular filter disc in regular increments. The stepping operation, preferably, is performed in such manner that substantial free space is left at each step between the annular filter diaphragm or the cake C thereupon and the face of the packed material in the container. As this free space is filled up with pulverulent material, the latter is compacted as a cake upon the annular filter disc and can be freed by the introduction of pressure into the filter-backing chamber D. By repeating these steps at proper intervals, the container is filled with a series of disc-like filter cakes assembled one upon the other.

It will be apparent that the conduit or connection 54 and valve 56 constitutes a refinement upon the apparatus. If preferred, the air may be allowed to exhaust from the filter directly to the atmosphere. To this end disc need be merely perforated at one or a plurality of points.

Apparatus for supporting and manipulating a container upon the pump tube 26 and filter and sealing element 42, comprises a carriage structure indicated at 58 which moves upon the main frame 20 and has a platform portion 58a. Means to guide the carriage in its movements comprises side rails 59 mounted upon the main frame. The carriage includes vertical side skirts 61 upon platform 58a which are provided with guide, or anti-friction, rollers engaging the side rails. The guide rollers include pairs of horizontal rollers 62 upon axles 63 mounted in the side skirts 61 to engage the edges of the rails 59. The skirts may be reinforced to withstand the added strain created by the axles by means of vertical bars 64 secured to the skirts and through which the axles extend.

Anti-friction means to maintain the carriage in predetermined, horizontal position, comprises vertical rollers 65 which are disposed in openings 66 in the side skirts upon axles 67. These axles are supported by cross bars 68 extending across the opening 66 and being secured to the side skirts by bolts 69. The axles are held in place in the cross bars by means of nuts 71.

Means to reciprocate the carriage comprise a longitudinal cylinder 75 (see Fig. 2) mounted upon a bar 76, flange portions 77 of which, are bolted to the side walls of the main frame as indicated at 78.

Pressure lines 79 and 81 at opposite ends of the cylinder and having valves 82 and 83, provide means whereby the piston 84 of the cylinder may be operated by fluid pressure. A piston rod 85 attached to the piston 84 is connected at its forward end to bracket 86 bolted as indicated at 87 upon the under face of the carriage platform 58a so that by admission of fluid to the cylinder 75 through lines 79 and 81, the piston rod and the attached carriage may be reciprocated as may be required, and as will subsequently be more fully described.

Means to support a container, such as, a drum 89 in horizontal position upon the platform 58a of the carriage 58 comprises a pair of spaced arms 91 which are mounted freely to rotate intermediate of their length and outside the main frame 20, upon an axle 92, disposed transversely in bearings 94 upon carriage. The arms 91 are provided upon their opposite sides, with interconnecting cross bars 96 and 97. To the bar 96 are attached forwardly extending bars 98 designed to support between them the container 89. The arms 98 are braced to obtain adequate rigidity by means of diagonal bars or braces 99 attached at their lower extremities to the cross bar 97. It will be apparent that the space between the bars 98 may be adjusted for purposes of accommodating various diameters of containers. To this end, the bars 98 and the braces 99 are secured respectively to the cross bars 96 and 97 by releasable means, such as, bolts 101.

It is to be understood that in the packing of a container 89 by means of the apparatus shown, the carriage is initially retracted toward hopper 24 so that the mouth of the container is approximately at the position indicated, in broken line as P in Fig. 1 and so that the filter and sealing element indicated broadly as 42 is at or near the bottom of the container. When the screw conveyor 29 is operated under such conditions as to exert a hydrostatic head of pressure as required for the packing of the material in the container in accordance with this invention, it will be apparent that the pressure tending to rotate the arms 91 backward about shaft 92, is quite substantial.

In order to prevent such rotation, an appropriate latch mechanism is required. This mechanism is attached to lower extensions 103 of arms 91 below axle 92, as shown in Figs. 1 and 4 of the drawing. The extensions 103 as will be observed in exploded view Fig. 4 are provided with a pair of welded or otherwise securely mounted blocks, 104 and 105, which are spaced to receive between them, the rear end of a latch 106. Each of the latter elements is bored as at 108 at its rear end to receive a pin 108a which can be dropped through a bore 109 into position to provide a pintle for the latch. The pintle at its lower extremity, also enters a bore 111 extending partly through the block 105. At their swinging ends, the latches 106 are provided with detents or hook portions 112 adapted to engage vertical bars 113 rigidly bolted upon the side skirts 61 of the carriage 58 to prevent rotation of the arms while the container is being filled. It will be apparent that the bars 113 also act as limit stops engaging extensions 103 to prevent the arms 91 from tilting too far forward during, or prior to a filling operation.

The pressure of the pulverulent material also tends to force carriage 58 away from the filtering and sealing head 42 with but little packing pressure upon the material. In order yieldably to resist such pressure, pressure may be exerted in the forward (piston rod) and of the cylinder 75. This pressure may be adjusted to obtain any reasonable degree of variation of the packing of the material in the container. As the packing operation is continued, the container is allowed to move away from the hopper 24. As the container approaches the limit of its backward movement, but while the tube 52 is still within the container, it is desirable to stop the motor 39. This pause permits the gaseous fluid which may be under pressure within the container to escape before the sealing tube 52 is deflated. Means automatically to stop the motor when the container is at desired point in its backward travel, comprises a limit switch indicated diagrammatically at 115. This is mounted upon a bracket 115a, secured (preferably longitudinally adjustably) upon the side of frame 20 and is provided with a button or other contact element 115b adapted to be engaged by cam 115c, of skirt 61 of carriage 58 in its travel to shut off the electrical current of the motor 39. Chamber D is then vented through line 57a and after the pressure in the container has dropped sufficiently, valve 53a is operated and the tube 52 is deflated and pressure is admitted to the cylinder 75 to cause the carriage to move backwardly, thus completing the retraction of the sealing and filtering structure from the container.

At this stage, it is desirable that the latch 106 be released from the bar 113 to permit the arms 91 to be tilted backwardly and thus to bring the container 89 to vertical position. Means to accomplish this function comprises a second set of arms 114 having angularly disposed rear extensions 116 and being rigidly secured upon the shaft 92, for example, by means of suitable keys (not shown). When arms 114 are horizontal, extensions 116 are at a substantial angle to the vertical but are so disposed that when the arms are rotated to a sufficient degree, they engage the set screws 104a, threaded in the sides of blocks 104.

Arms 114 and extensions 116 are inter-connected by means of arcs 117 bolted in position as indicated at 118, substantially concentric with the shaft 92. The arcs are provided with radially extending pins 119 which are adapted to strike corresponding pins 121 projecting laterally from the latches 106. When the arms 114 are rotated, the pins 119, striking the pins 121, operate the latches to disengage the latter from the bars 113 and thus leave the arms 91 free to rotate upon the shaft 92.

Means to rotate the shaft 92 is indicated as comprising an arm 122 keyed upon the shaft 92 and being pivotally-connected at its lower extremity to a piston rod 123 which extends backwardly into a cylinder 124 pivoted as indicated at 126 to a bracket 127 bolted upon the lower face of the carriage platform 58a. Flexible conduits 130 and 131 connected to opposite extremities of the cylinder and having valves 130a, provide means for admitting fluid under pressure to the cylinder to operate piston 132 within the latter.

It will be manifest that the cylinder 124 travels as a unit with the carriage. When the carriage has reached the limit of its travel away from the hopper 24, thus clearing the end of the container 89 from the filter and sealing element 42, pressure may be admitted to the cylinder 124 to operate the arm 122. The arcs 117 swing upwardly to engage pins 119 with pins 121, thereby releasing the latches 106 from the bars 113 so that the arms 91 can be swung backwardly to move the container to the dotted line position indicated at A in Fig. 1.

Various means for the tilting of the arms 91 may be employed. For example, they may be tilted manually. Also, various power means to rotate the arms may be included. However, for purposes of illustration, this function may be initiated by the extensions 116 upon arms 114. These extensions, as already described, rotate, after latches 106 are released, to engage heads of set screws 104a threaded into the sides of blocks 104, thus causing the arms 91 to tilt, swinging the container 89 toward vertical position. These screws can be adjusted to permit completion of the folding operation before the drum begins to tilt.

As this movement is continued, it will be evident that the center of gravity of the combined mass including the arms and the packed container will swing past the vertical plane of shaft 92. The mass, if unarrested, would then drop back abruptly under its own weight. To prevent this, the arms 91 may be grasped manually and lowered to unloading position (dotted line position). It is preferred, however, to provide mechanical means to obtain the same function. Such means is shown as comprising second latches constituting lost motion connections.

The second latches are shown in Fig. 4 as including plates or bars 135 having holes 136 therein providing points of pivoting upon pins 137 extending transversely inwardly from the extensions 116. Back portions 135a of the plates constitute counterweights tending to balance the plates.

Plates 135 are cut out to provide downward extensions 138 stepped as indicated at 139. It will be apparent that when the arms 91 are in vertical position and the arms 114 are in horizontal position, the stepped portions 139 ride above the top surfaces, T of the blocks 104. The latches 135, therefore, are inoperative and are supported substantially in horizontal position by arms 141 having pins 142 engaging the upper surface of the platform 58a. The plates or bars 135 move forward during rotation of shaft 92 and extensions 116. Ends of bars 135 having extensions 138 are held up by pins 142 sliding upon said platform. The members 135 continue to move forward as arms 114 rotate, until portions 139 are passed and notched out portions 139a are above the top of blocks 104.

At this stage, the latch bars 135 are held inoperative by pins 142 upon said platform 58a. However, before the center of gravity of the arms 91 and their load pass the vertical plane of the shaft 92, the plate is rotated to lift the pins 142 from the platform. The bar then engages surface T, of the blocks 104 and the vertical edges of steps 139 engage over the vertical edges (toward hopper 24) of said blocks. The arms 91 may be rotated by their associated piston mechanism to the dotted line position as at A, in which arms 91 are inclined rearwardly and downwardly as shown in dotted line. The packed container may then be removed by gravity, the movement being facilitated by rollers 145 journalled in arms 91.

In the packing of many pulverulent materials in the containers, it is desirable to provide liners such as indicated at L. These may be of polyethylene, paper, or other material. They usually project beyond the mouth of the container to provide a sealing proportion. The resultant lip is a convenience in catching any pulverulent material which may tend to tumble or slide out, as the filtering and sealing device 42 is removed from the container.

The lip may be held up or folded by hand until the container is tilted toward vertical. However, a mechanical folder or holder may also be provided. This is illustrated by a folder mechanism comprising rods 150 adjustably disposed in lugs 151 upon the sides of arms 114. These rods are interconnected at their ends by a roller 153 which, as the arms 114 are rotated at the conclusion of a filling operation and after the filtering and sealing head 42 has been retracted from the container, move upwardly across the mouth of the container partially to fold the projecting portion of the liner. This movement is permitted before the arms 91 start to tilt backward, because the extensions 116 have not yet contacted set screws 104a in blocks 104.

The operation of the packing machine will now be briefly described. It will be assumed that the carriage 58 is in its retracted position and is so held by latches 106. A container, such as, a drum 89, is disposed upon bars 98 with the mouth thereof and the mouth of the liner L contiguous to filtering and sealing device 42 as shown in full line in Fig. 1.

Fluid under pressure is then admitted to longitudinal cylinder 75 to operate piston 84 and thus to advance the container and its liner coaxially over the conveyor and to bring the filtering and sealing device 42 to or almost to the bottom of the container. Sealing tube 52 is inflated to provide a seal about filter.

The screw conveyor 29 is then started to initiate the packing operation by feeding pulverulent, dust-like, material from hopper 24. It is essential that the material be discharged from the conveyor under a hydrostatic type of pressure. Possibly this could be obtained by mixing the pulverulent material in well known manner with a small amount of air so that it behaves as a viscous fluid and then discharging it into the container at relatively slow screw speed. The filtering and sealing element will then allow the air to escape as the container is filled.

However, it usually is simpler and more convenient to drive the screw conveyor as previously described at relatively high speed, for example, at about 1400 to 3000 r.p.m. or better yet, at about 1800 to 2300 r.p.m. Under these conditions the powder acts as fluid and as it flows into the container under pressures, for example, of 4 pounds to about 10 pounds per square inch are exerted across the entire section of the container. Doubtless, this pressure is attained by backing up of the material between the filter disc 43a (or its foraminous coverings 46 and 46a) and the body of material in the container.

Theoretically, there is no particular upper limit to the speed of rotation of conveyor 29 except that, with a hopper feed as shown, at excessively high speeds, the pulverulent material is thrown away from the feed end of the screw without being carried forward into the pump tube 26. When the screw conveyor 29 is rotated at about 1400 to 2000 r.p.m., there appears to be a large amount of slippage between the surface of the screw and the material being conveyed. For example, the average rate of travel is only about 25 percent of the theoretical value it would have if the material acted as a solid mass rather than a viscous fluid.

As the screw conveyor is operated as above described, the pulverulent material is rapidly packed to a high density, any air in the mass escapes through the filter cloth 46a where suspended material is almost completely removed.

As previously indicated, a braking action upon the backward movement of the container can be set up by use of high pneumatic pressures in tube 52 thus producing a strong frictional drag on the surface of the container. It is usually better, however yieldably to counterbalance the hydrostatic pressure exerted against the bottom of the container by the mechanism shown in Figs. 1, 2 and 4.

In this operation, the pressure exerted by the pulverulent material tends to rotate the arms 91 about shaft 92, a movement which is prevented by latch 106, engaging bar 113. Thrust is thus transmitted to the carriage 58 and is yieldably resisted by the piston 84 in cylinder 75. The pressure over the relatively large surface in the container overcomes the pressure upon the piston and the container is forced away from the filtering and sealing member 42 until it (the container) is adequately filled. The screw conveyor is then stopped, and the piston 84 is operated to clear the mouth of the container from the filtering and sealing element.

At this stage, pressure is admitted to cylinder 124 to retract piston 132, thus rotating shaft 92 and causing arms 114 to swing upwardly, partially to fold the mouth of the liner and also to contact pins 119 with pins 121, thus releasing latches 106 from bars 113.

Continued movement of arms 114 engages extensions 116 with the set screws 104a in the side of blocks 104 on the extension, 103 of arms thus causing the arms 91 to rotate on shaft 92. The bars 135 also slide forward during this cycle and as the arms 91 and the load thereupon approach dead center, the step portions 139 hook upon the edges of the block 104 positively to prevent the arms from abruptly falling back to the position represented at A.

The container is then removed from rollers 145, the motion of shaft 92 is reversed to return the arms 91 to their initial position. A fresh container is placed upon arms 98 and the cycle is repeated.

In the foregoing operation, the switch of the drive motor and the valves controlling the pressure cylinders 75 and 124 may be operated manually if desired. They obviously may also be provided with automatic controls constructed to operate them in proper sequence.

By use of the foregoing apparatus a very high degree of packing can be attained. A conventional drum that will hold about 150 pounds of a well known pulverulent material when subjected to efficient vacuum compaction, will hold almost 200 pounds when it is packed with the foregoing apparatus. Indeed, it is quite possible with the foregoing apparatus, to pack many materials so tightly as to cause a tendency to caking. This may be undesirable, but can be obviated by reducing the back pressure upon the carriage 58, exerted by cylinder 75 and its piston 84.

In Fig. 5 is illustrated the use of an attachment for sealing about the mouth of a container where the insertion of the sealing and filtering head 42 all of the way into the container is not required or is not practicable. This device is especially suitable for use to pack pulverulent material into pails or other shallow containers or where the mouth of the container is restricted, as for instance, by an annular, internal flange, such as is used with some press fit lids.

The container to be filled, as shown in Fig. 5, comprises a body 160 and an annulus 161 partially closing the mouth of the container and being designed to receive a conventional, press fit lid (not shown).

Sealing means for the mouth of the container while it is being filled, is shown as comprising an annular disc 162 which preferably is of flexible material, such as rubber or a flexible plastic. If desired, it may be foamed or cellulated to increase its yieldability to pressure. It may be attached to the sealing and filtering head 42 by appropriate means (not shown) or as shown in the drawing, it may be provided about its inner perimeter with an axially-extending flange 163 adapted to engage the mouth or side of the container.

This sealing disc 162 may be applied to the mouth of the container to be filled. The container is then brought over the discharge end of the tube 26 so that the sealing disc is pressed against the face of the filter. The container may be held in place while it is being filled manually, or if preferred, it may be disposed upon the arms 98. The pressure between the container and the disc 162 is then maintained by appropriate operation of the carriage 58. At the end of the filling operation, the disc 162 is removed for reuse.

The foregoing apparatus is shown in Figs. 1 through 4 as being disposed in horizontal position. This is primarily a matter of convenience adapting the mechanism for operation as a portable unit adapted to be shoved under bins or hoppers of particular type; namely, those where vertical clearance is limited. It will be apparent that the principles of fluid flow in packing pulverulent material in containers, as described in connection with the foregoing apparatus can also be used for packing containers in vertical position. In fact, such vertical packing where practicable, permits of simplification of the apparatus because it is then not necessary to tilt the packed containers from the horizontal to the vertical position. Tilting mechanisms or the arms 91 may then be dispensed with.

In those instances where it is not required to insert the filtering and sealing head in the container to get maximum packing, the filter may be provided with a sealing tube designed to fit over the outside of the container.

It has been described to operate the apparatus by maintaining the filling tube (26) and the head 42 in fixed position while moving the container to be packed relative to the filtering and sealing head. It will be apparent to those skilled in the art that, if preferred, the container itself may be maintained in fixed position and the packing mechanism including the tube 26 and filtering and sealing head 42 may be moved up to the container.

We claim:

1. Apparatus for packing pulverulent material into a container, comprising a horizontal screw conveyor of substantially less diameter than the container to be packed, a filter diaphragm disposed about the discharge end of the conveyor and being adapted to fit within the container, a toroidal pneumatic tube disposed about the filter diaphragm providing a seal between the edges of the same and the contiguous walls of the container, guide means spaced below, but parallel to the screw conveyor, a carriage reciprocably mounted upon the guide means, arms to support a container to be packed and being hinged to the carriage to rotate upon a horizontal axis transverse of the carriage, the arms being tiltable substantially between horizontal position and vertical position, the arms being adapted to hold said container in either horizontal position while it is being packed or in vertical position after it is packed, arms also hinged to the carriage to swing substantially in the same direction as the first-mentioned arms, means to operate the latter arms to fold the mouth of a flexible liner projecting from a container while the latter is in horizontal position after it is packed, whereby to prevent loss of pulverulent material from the container and means subsequently to swing the first-mentioned arms to bring the container to vertical position, said carriage being further provided with means to reciprocate the same to insert the screw conveyor into a container in horizontal position upon the first-mentioned arms and being yieldable to resist backward movement of the carriage as the container is filled and means to drive said screw conveyor at a speed to impel the pulverulent material under a fluid-like hydrostatic pressure exerted in all directions between the diaphragm and the material packed in the container.

2. Apparatus for packing pulverulent material into a container, comprising a horizontal screw conveyor of substantially less diameter than the container to be packed, a filter diaphragm disposed about the discharge end of the conveyor and being adapted to fit within the container, a toroidal pneumatic tube about the filter diaphragm providing a seal between the edges of the same and the contiguous walls of the container, guide means spaced below but parallel to the screw conveyor, a carriage reciprocably mounted upon the guide means, arms hinged to the carriage to rotate upon a horizontal axis transverse of the carriage, the arms being tiltable substantially between horizontal position and vertical position, the arms being adapted to swing to hold a container in either horizontal position or vertical position, folding arms also hinged to the carriage to swing substantially in the same direction as the first-mentioned arms, means to operate the folding arms to fold upwardly the mouth of a liner projecting from a container while the latter is in horizontal position and means subsequently to swing the first-mentioned arms to bring the container to vertical position and comprising a lost motion connection between the first-mentioned arms and the second-mentioned arms whereby when said liner is folded and the second-mentioned arms are further operated, the first-mentioned arms are swung as a unit with the second-mentioned arms to bring the container thereupon to said vertical position.

3. Apparatus for packing pulverulent material into a container, said apparatus comprising a horizontal screw conveyor of substantially less diameter than the container to be packed, a filter diaphragm disposed about the discharge end of the conveyor and being adapted to fit within the container to be filled, a toroidal pneumatic tube disposed about the filter diaphragm and providing a seal between the edges of the same and the contiguous walls of the container, guide means spaced below, but parallel to the screw conveyor, a carriage reciprocably mounted upon the guide means, arms hinged to the carriage to rotate upon a horizontal axis transverse of the carriage, the arms being tiltable substantially between the horizontal position and vertical position, the arms being adapted to hold a container in either horizontal position while it is being filled or to swing to hold it in vertical position after it is filled, a latch for locking the arms to the carriage whereby to prevent rotation thereof due to pressure exerted on the bottom of the container during a filling operation, means mounted upon the carriage to tilt the arms, means to release the latch before the arms are tilted, means to reciprocate the carriage to move a horizontal container upon the arms to or from the screw conveyor and means to drive the screw conveyor at a speed to impel the pulverulent material into the container under hydrostatic pressure.

4. Apparatus for packing pulverulent material into a container, said apparatus comprising a horizontal conveyor of substantially less diameter than the container to be packed and being adapted to discharge the material under fluid-like flow, a filter diaphragm disposed about the discharge end of the conveyor and being adapted to fit within the container to be filled, a toroidal pneumatic tube about the filter diaphragm providing a seal between the edges of the same and the contiguous walls of the container, guide means spaced below, but parallel to the conveyor, a carriage reciprocably mounted upon the guide means, arms to support a container to be filled, the arms being hinged to the carriage to rotate upon a horizontal axis transverse of the carriage, means to tilt the arms substantially between a horizontal position and vertical position whereby to hold a container either in horizontal position while it is being filled or in vertical position after it is filled, a latch for locking the arms upon the carriage whereby to prevent rotation thereof due to pressure exerted on the bottom of the container during a filling operation, means associated with the arms to release said latch after the filling operation to permit the arms to be swung to bring the packed container to vertical position, means to reciprocate the carriage to advance a horizontal container carried by the arms upon, or to remove said container from the screw conveyor.

5. Apparatus as defined in claim 1, in which said means to swing the first-mentioned arms comprises means operable to connect the first- and second-mentioned arms together after the liner has been folded so that they will swing as a unit.

6. Apparatus for packing pulverulent material into a container, said apparatus comprising a horizontal screw conveyor of substantially less diameter than the container to be packed, a filter diaphragm disposed about the discharge end of the conveyor and being adapted to fit within the container, a toroidal, pneumatic tube about the filter diaphragm providing a seal between the edges of the same and the contiguous walls of the container, guide means spaced below and parallel to the screw conveyor, a carriage reciprocably mounted upon the guide means, a horizontal shaft disposed to rotate in bearings disposed upon and transversely of the carriage, a pair of arms disposed to rotate upon the shaft, the arms being adapted to support a container to be filled, means to latch said arms to prevent rotation thereof while a container thereupon is being filled, a pair of folding arms rigidly secured upon the shaft and being adapted to fold a liner end projecting from the container, means to rotate said shaft when a container is filled, means associated with the second-mentioned arm to release the means to latch the first-mentioned arms, said carriage being provided with means to reciprocate the same whereby to insert the screw conveyor into a container disposed upon the first-mentioned arms and yieldably to resist backward movement of the carriage as the container is filled, and means to drive said screw conveyor at a speed to impel the pulverulent material under a fluid-like pressure exerted in all directions between the diaphragm and the material packed in the container.

7. Apparatus for packing pulverulent material into a container comprising a horizontal screw conveyor of substantially less diameter than the container to be packed, a filter diaphragm disposed about the discharge end of the conveyor and being adapted to fit within the container, a toroidal, pneumatic tube disposed about the filter diaphragm and providing a seal between the edges of the same and the contiguous walls of the container, guide means spaced below and parallel to the screw conveyor, a carriage reciprocably mounted upon the guide means, a horizontal shaft disposed to rotate in bearings upon and transverse of the carriage, a pair of arms disposed to rotate upon the shaft, the arms being adapted to support a container to be filled, means to latch said arms to prevent rotation thereof while a container thereupon is being filled, a pair of arms rigidly secured upon the shaft and being adapted to fold a flexible liner end projecting from the container after the latter has been filled, means to rotate said shaft when a container is filled, means associated with the second-mentioned arms to release the means to latch the first-mentioned arms, and means after the folding operation is completed to latch the first-mentioned arms and the second-mentioned arms together whereby they are rotated as a unit upon further operation of the means to rotate said shaft, said carriage being provided with means to reciprocate the same to insert the screw conveyor into a container upon the first-mentioned arms and yieldable to resist backward movement of the carriage as the container is filled and means to drive said screw conveyor at a speed to impel the pulverulent material under a fluid-like pressure exerted in all directions between the diaphragm and the material packed in the container.

8. Apparatus for packing pulverulent material into a container, said apparatus comprising a horizontal tube for conveying the pulverulent material to be packed, means for forcing pulverulent material through the tube and discharging the same under semi-fluid flow and pressure into the container, said tube having a filter diaphragm disposed about the discharge end thereof and means to seal between the edge of the diaphragm and the contiguous walls of the container, horizontal guide means disposed below and parallel to the tube, a carriage mounted to reciprocate upon the guide means a shaft mounted transversely of and in bearings fixed upon the carriage, arms adapted to support the container, to be filled in horizontal position and being disposed to rotate upon the shaft, means to latch the arms from rotation when the container is horizontal, a pair of arms for folding the projecting mouth of a liner for the container and being rigidly secured upon the shaft, means to rotate the shaft, means to release said latch when a container is filled, a lost motion means to lock the first-mentioned and the second-mentioned arms together so that they will rotate as a unit after the mouth of the liner has been folded and the shaft is further rotated to bring the container to vertical position and means to reciprocate the carriage to position a container while it is in horizontal position upon the first-mentioned arms, upon the filtering diaphragm, the latter means being yieldable to resist backward movement of the carriage as the container is filled.

9. A method of packing a pulverulent material into a container having a bottom and side walls, which method comprises mixing said pulverulent material with air in an amount to obtain a fluent mixture of the two, sealing a filter around a feed tube at the discharge end thereof, the filter having a diameter substantially greater than the diameter of the tube, inserting the outlet end of the tube with the filter thereupon into said container near the bottom thereof, sealing between the outer perimeter of the filter and the inner face of the container wall, continuously discharging a stream of said fluent mixture through the tube and starting in a zone near the bottom of the container, the material being discharged at a velocity to exert fluent pressure in all directions from the discharge end of the tube, passing the entrapped air through said filter and holding back the pulverulent material, whereby the pulverulent material is packed between the bottom of the container and the inner face of the filter over substantially the entire area of each, backing off the filter at a rate which develops the desired packing pressure and continuing to discharge the fluent mixture between it and the packed material in the bottom of the container until the latter is filled to the desired degree.

10. In a method of packing pulverulent material in a container by means of a screw conveyor, the steps of inserting the conveyor coaxially into the container substantially to the bottom thereof, driving the conveyor at a speed of about 1000 r.p.m. to about 3000 r.p.m. to introduce sufficient air to fluidize the pulverulent material and to cause the material to exert fluent pressure across the entire section of the container, whereby to pack the material into the container across the entire section thereof, passing entrapped air from the container as it is packed, through a filter and filtering the pulverulent material contained therein, and increasing the spacing of the filter and the bottom of the container as the material is packed, while exerting sufficient resistance to the spacing movement to pack the material to the desired degree and density.

11. Apparatus for packing a pulverulent material in a container, comprising a horizontal screw conveyor of substantially lesser diameter than the container to be packed, a filter diaphragm sealed about the discharge end of the conveyor and being adapted to fit within the container, a sealing element disposed about the diaphragm, providing a seal between the walls of the container and the diaphragm, guide means spaced from, but parallel to the screw conveyor, a carriage reciprocatingly mounted upon the guide means and supporting the container to be filled substantially coaxially with respect to the conveyor with the bottom of the container initially near the discharge end of the conveyor, said carriage being disposed to move the container coaxially onto the conveyor, means yieldably to resist backward movement of the carriage due to pressure exerted in packing the pulverulent material into the container, and means to drive the conveyor at a speed of about 1000 r.p.m. to about 3000 r.p.m. to introduce sufficient air to fluidize the pulverulent material and to exert fluent pressure between the face of the material in the container and the contiguous face of the diaphragm substantially across the entire width thereof, and means upon the carriage for tilting the container from horizontal to vertical position after the container has been filled.

12. The method of packing pulverulent material into a container, which method comprises forcing the material into said container by a screw conveyor operating in an enclosed tube at a speed of about 1000 r.p.m. to about 3000 r.p.m. to introduce sufficient air to fluidize the pulverulent material and to impart fluid flow to the material while maintaining a filtering seal between the tube and the side walls of the container, and passing the entrapped air from the mixture through the seal and removing suspended pulverulent material from the air.

13. In an apparatus for packing aerated pulverulent material into a container, a horizontal screw conveyor disposed in a feed tube, a diaphragm element sealed upon the end of the feed tube and being of a size sufficient to fit within a container to be filled, a sealing element disposed about the diaphragm and filtering means associated with the diaphragm allowing air to escape from the container while it is being filled, and filtering pulverulent material in suspension while air is escaping, and means to drive the screw conveyor at a speed of about 1000 r.p.m. to about 3000 r.p.m. to introduce sufficient air to fluidize the pulverulent material before it is introduced into the container.

14. A machine for packing pulverulent material into containers, said machine comprising a horizontal screw conveyor disposed in a feed tube of a cross-section less than the cross-section of the container to be packed, a carriage for moving the container onto the screw conveyor so that the discharge end of the conveyor is near the bottom of the container, a filtering head disposed on the tube normal to the axis of the screw conveyor and being contiguous to the discharge end of the conveyor, said filtering head being provided with a filter-like diaphragm sealed thereabout, and having a sealing element disposed between the diaphragm and the side walls of the container, said diaphragm permitting air entrapped in the space between the filtering head and the container to escape as the container is packed with pulverulent material, and to retain pulverulent material borne by the escaping air, means to rotate the screw conveyor at a speed of about 1000 r.p.m. to about 3000 r.p.m. to introduce sufficient air to fluidize the pulverulent material and to force the pulverulent material into the container under fluent pressure extending over the entire cross-section of the container, and means yieldably to resist movement of the carriage due to back pressure exerted by the material between the filtering head and the bottom of the container as the material is packed into the container.

15. In a method of packing pulverulent material in a container by means of a screw conveyor, said conveyor being disposed in a feed tube, the tube having a filtering head sealed upon the discharge end thereof, said head being formed to provide a seal between the discharge end of the conveyor and the side walls of the container, said head further having a filter for removing pulverulent material suspended in the air entrapped in the container; the steps of inserting the conveyor coaxially into the container with the discharge end thereof having the filtering head disposed contiguous to the bottom of the container, rotating the conveyor at a speed of about 1000 r.p.m. to about 3000 r.p.m. to introduce sufficient air to fluidize the pulverulent material and to exert fluent pressure across the entire section of the container, whereby to force air from the material and to pack the material into the container across the entire section thereof, and to force air escaping from the container through the filter, and removing suspended pulverulent material from the escaping air, and backing off the container while exerting sufficient resistance to the backing movement to pack the material in the container.

References Cited in the file of this patent

UNITED STATES PATENTS

| | | |
|---|---|---|
| 225,028 | Strauh | Mar. 2, 1880 |
| 295,863 | Ellithorp | Mar. 25, 1884 |
| 367,857 | Smith | Aug. 9, 1887 |
| 494,979 | Dawson | Apr. 4, 1893 |
| 653,760 | Webjornsen | July 17, 1900 |
| 821,463 | Cornwall | May 22, 1906 |
| 924,240 | Merritt | Feb. 15, 1910 |
| 949,240 | Merritt | Feb. 15, 1910 |
| 2,142,990 | Belcher | Jan. 10, 1939 |
| 2,630,248 | Hinz | Mar. 3, 1953 |
| 2,775,267 | Stirn et al. | Dec. 25, 1956 |